(12) United States Patent
Sazegari et al.

(10) Patent No.: US 7,107,304 B2
(45) Date of Patent: Sep. 12, 2006

(54) SINGLE-CHANNEL CONVOLUTION IN A VECTOR PROCESSING COMPUTER SYSTEM

(75) Inventors: Ali Sazegari, Cupertino, CA (US); Doug Clarke, San Diego, CA (US)

(73) Assignee: Apple Computer, Inc., Cupertino, CA (US)

( * ) Notice: Subject to any disclaimer, the term of this patent is extended or adjusted under 35 U.S.C. 154(b) by 409 days.

(21) Appl. No.: 09/996,877

(22) Filed: Nov. 30, 2001

(65) Prior Publication Data

US 2003/0191785 A1    Oct. 9, 2003

(51) Int. Cl.
*G06F 7/15* (2006.01)
(52) U.S. Cl. ...................................... 708/420
(58) Field of Classification Search .............. 708/420, 708/424
See application file for complete search history.

(56) References Cited

FOREIGN PATENT DOCUMENTS

WO    WO 01/90927 A    11/2001

OTHER PUBLICATIONS

Wang et al., "Parallel-decomposition Algorithm for Discrete Computational Problems . . . ", IEE Proceedings: Vision, Image and Signal Processing, Institution of Electrical Engineers, vol. 142, No. 1, Feb. 1, 1995, pp. 40-46.
Gardner, "Efficient Convolution Without Input-Output Delay", Journal of the Audio Engineering Society, Audio Engineering Society, vol. 43, No. 3, Mar. 1, 1995, pp. 127-135.
Torger et al., "Real-time Partitioned Convolution for Ambiophonics Surround Sound", IEEE Workshop on the Applications of Signal Processing on Audio and Acoustics, Oct. 21-24, 2001, pp. 195-198.
Agarwal et al. "Fourier Transform and Convolution Subroutines for the IBM 3090 Vector Facility", IBM Journal of Research and Development, vol. 30, No. 2, Mar. 1, 1986.

*Primary Examiner*—Tan V. Mai
(74) *Attorney, Agent, or Firm*—Buchanan Ingersoll PC

(57) ABSTRACT

A system and method for performing convolution in a single channel of a vector processing computer system takes advantage of the parallel computing capability of the vector processing system and the distributed properties of the discrete-time convolution sum by performing convolution on portions of an overall data stream, or data chunks, simultaneously. Partial solution are thereby obtained and superimposed to achieve an overall solution data stream. To simplify the convolution sum and eliminate the need for calculating products, a specialized data signal or vector containing a series of ones may be used in the convolution operation.

20 Claims, 8 Drawing Sheets

$$y[0] = g[0]$$
$$y[1] = g[0] + g[1]$$
$$y[2] = g[0] + g[1] + g[2]$$
$$y[3] = g[0] + g[1] + g[2] + g[3]$$
$$y[4] = g[0] + g[1] + g[2] + g[3] + g[4]$$
$$y[5] = g[0] + g[1] + g[2] + g[3] + g[4] + g[5]$$
$$y[6] = g[0] + g[1] + g[2] + g[3] + g[4] + g[5] + g[6]$$
$$y[7] = \phantom{g[0] + } g[1] + g[2] + g[3] + g[4] + g[5] + g[6] + g[7]$$
$$y[8] = \phantom{g[0] + g[1] + } g[2] + g[3] + g[4] + g[5] + g[6] + g[7] + g[8]$$
$$y[9] = \phantom{g[0] + g[1] + g[2] + } g[3] + g[4] + g[5] + g[6] + g[7] + g[8] + g[9]$$
$$\vdots$$

$$y[0] = g[0]$$
$$y[1] = g[0] + g[1]$$
$$y[2] = g[0] + g[1] + g[2]$$
$$y[3] = g[0] + g[1] + g[2] + g[3]$$
$$y[4] = g[0] + g[1] + g[2] + g[3] + g[4]$$
$$y[5] = g[0] + g[1] + g[2] + g[3] + g[4] + g[5]$$
$$y[6] = g[0] + g[1] + g[2] + g[3] + g[4] + g[5] + g[6]$$
$$y[7] = g[1] + g[2] + g[3] + g[4] + g[5] + g[6] + g[7]$$
$$y[8] = g[2] + g[3] + g[4] + g[5] + g[6] + g[7] + g[8]$$
$$y[9] = g[3] + g[4] + g[5] + g[6] + g[7] + g[8] + g[9]$$
$$\cdots \cdots$$

Figure 4

$$
\begin{aligned}
y[N-1] &= g[N-7] + g[N-6] + g[N-5] + g[N-4] + g[N-3] + g[N-2] + g[N-1] + g[N] \\
y[N] &= g[N-6] + g[N-5] + g[N-4] + g[N-3] + g[N-2] + g[N-1] + g[N] \\
y[N+1] &= g[N-5] + g[N-4] + g[N-3] + g[N-2] + g[N-1] + g[N] \\
y[N+2] &= g[N-4] + g[N-3] + g[N-2] + g[N-1] + g[N] \\
y[N+3] &= g[N-3] + g[N-2] + g[N-1] + g[N] \\
y[N+4] &= g[N-2] + g[N-1] + g[N] \\
y[N+5] &= g[N-1] + g[N] \\
y[N+6] &= g[N] \\
y[N+7] &= 0
\end{aligned}
$$

Figure 5

| Row \ Column | 1 | 2 | 3 | 4 | 5 | 6 | 7 | 8 |
|---|---|---|---|---|---|---|---|---|
| 1 | g[0] | g[1] | g[2] | g[3] | g[4] | g[5] | g[6] | g[7] |
| 2 | g[8] | g[9] | g[10] | g[11] | g[12] | g[13] | g[14] | g[15] |
| 3 | g[16] | g[17] | g[18] | g[19] | g[20] | g[21] | g[22] | g[23] |
| 4 | g[24] | g[25] | g[26] | g[27] | g[28] | g[29] | g[30] | g[31] |
| 5 | g[32] | g[33] | g[34] | g[35] | g[36] | g[37] | g[38] | g[39] |
| 6 | g[40] | g[41] | g[42] | g[43] | g[44] | g[45] | g[46] | g[47] |
| 7 | g[48] | g[49] | g[50] | g[51] | g[52] | g[53] | g[54] | g[55] |
| 8 | g[56] | g[57] | g[58] | g[59] | g[60] | g[61] | g[62] | g[63] |

Figure 6A

|   | Column | | | | | | | |
|---|---|---|---|---|---|---|---|---|
| Row | 1 | 2 | 3 | 4 | 5 | 6 | 7 | 8 |
| 1 | g[0] | g[8] | g[16] | g[24] | g[32] | g[40] | g[48] | g[56] |
| 2 | g[1] | g[9] | g[17] | g[25] | g[33] | g[41] | g[49] | g[57] |
| 3 | g[2] | g[10] | g[18] | g[26] | g[34] | g[42] | g[50] | g[58] |
| 4 | g[3] | g[11] | g[19] | g[27] | g[35] | g[43] | g[51] | g[59] |
| 5 | g[4] | g[12] | g[20] | g[28] | g[36] | g[44] | g[52] | g[60] |
| 6 | g[5] | g[13] | g[21] | g[29] | g[37] | g[45] | g[53] | g[61] |
| 7 | g[6] | g[14] | g[22] | g[30] | g[38] | g[46] | g[54] | g[62] |
| 8 | g[7] | g[15] | g[23] | g[31] | g[39] | g[47] | g[55] | g[63] |

Figure 6B

SINGLE-CHANNEL CONVOLUTION IN A VECTOR PROCESSING COMPUTER SYSTEM

FIELD OF THE INVENTION

The present invention relates generally to signal processing within a computer processor. More particularly, the present invention relates to convolution operations in a vector processing computer system.

BACKGROUND OF THE INVENTION

One of the most important, value-adding features in a computer is its ability to process large amounts of data and information. Some of the information frequently processed by a computer includes image and other signal information. Frequently, information processed on a computer may relate to the general computer display, computer graphics, scanned images, video, and other data. With each of these types of data, it is often desirable to utilize the convolution function to process the data.

Convolution is useful in demonstrating the manner in which two signals interact in the time domain, and in expressing a resulting signal from the mixing of the two signals within the time domain. Mathematically, convolution is the multiplication of two sequences, which can be expressed in the form of an integral shown below in equation 1.

$$y(t) = f(t) \circledast g(t) \equiv \int_{-\infty}^{\infty} f(\tau) g(t - \tau) d\tau \quad (1)$$

In Equation 1, two signals f(t) and g (t) are convolved to yield the resulting signal y(t). The far right side of Equation 1 shows the general convolution integral wherein the signals are expressed in terms of $\tau$ and $t-\tau$, as a sliding function. This convolution integral exhibits various useful properties. For example, the convolution operation is commutative, distributive, and associative and allows shifting of the resulting y (t) by the same amount as the input signals f(t) and g(t). The width along the t-axis of the resulting signal y(t) is the combined width of the two input signals f(t) and g(t).

Convolution may also be performed using a digital or discrete method. In this manner, the convolution integral is expressed as a convolution sum. Equation 2 below shows a general convolution sum.

$$y[k] = f[k] \circledast g[k] = \lim_{T \to 0} \sum_{m=-\infty}^{\infty} f[m] g[k-m] \quad (2)$$

This convolution sum is the discrete-time equivalent of the convolution integral shown in Equation 1. In Equation 2, two discrete input signals f[k] and g[k] are convolved using the convolution sum to obtain the resulting signal y[k]. One of the signals is reflected about the y-axis and translated over the entire range of values of m (in this case the width of g[k]), whereupon the values of the two signals are multiplied together at each commonly shared discrete location and the products of each value of m are summed. T represents the sampling frequency, or sampling interval. This is the interval at which samples of the continuous functions are taken and corresponds to the spacing between discrete values of the discrete functions. Using the discrete convolution sum allows a computer to perform discrete convolution calculation.

One of the main problems in performing convolution using a computer is that the process is inherently linear. For relatively long sequences, therefore, the convolution process can be quite lengthy. Generally, a computer reads each function to be convolved as a stream of data, one element at a time. This requires valuable processor time, and the time required increases proportionately to the complexity and length of the signals to be processed. This is especially problematic, for example, in image processing applications and/or video applications, where signals are complex and memory-intensive. In video applications, another problem arises in that the real-time display of images, which is essential for a user's understanding in viewing the video information, requires numerous computations at a high rate of speed without delays. If the convolution sum used to process these video signals delays the output of the video, the result may be difficulty in understanding the output signal.

As processor speeds and users' demands for quality increase, it is essential that signals which are processed by way of a convolution sum, such as the one shown in Equation 2, are processed in the most efficient manner without sacrificing quality. Even with the increased processor speeds of today, performing convolution as a serial process whereby entire streams of data are input, output, and computed sequentially, slows a computer's ability to process signals and information, and generally slows the processing of data involved in unrelated functions by the computer.

Recently, vector processing, which utilizes parallel computing operations, has been implemented in various computer systems. This type of computer processing has the advantage that multiple calculations may be performed simultaneously. This is accomplished by using vector calculations whereby entire matrices may be added, subtracted, multiplied, divided, or otherwise operated upon. However, even with the increased speeds afforded by performing vector calculations in a vector processing computer system, convolution has traditionally been a serial operation that does not take advantage of the vector processing power. As a result, an efficient, vector processing system may perform multiple tasks using parallel computing and not make use of the parallel calculating capability for convolution operations, thereby slowing the entire system while awaiting the results of a convolution calculation. The diminished processing speed is further exacerbated by the fact that linear processing typically occurs in a part of the computer's central processing unit separate from the vector processor. Consequently, the delays associated with transferring data between the linear and vector processors further slow the overall process.

Accordingly, it is desirable to create a system and method for performing convolution in a vector processing computer system that utilizes the parallel calculating capability of the system in a manner so as to make the most efficient use of the computer system.

SUMMARY OF THE INVENTION

In accordance with the present invention, these objectives are achieved by a system and method that performs convolution in a single channel of a vector processing computer system. This system and method take advantage of the distributive properties of the discrete-time convolution sum by reading in data, buffering data into a given number of data chunks, transposing the data chunks within a matrix to align the first bit of each data chunk, performing the convolution sums on each of the columns of a matrix simultaneously, storing the results from each column's convolution sums as partial solutions, superimposing the results of each column's convolution sums into a single data stream representing an overall solution to be further processed by the computer. According to an embodiment of the invention, the data is transposed and manipulated within a matrix. According to another embodiment of the present invention, one of the data signals or vectors used in the convolution sum is a vector comprising a series of ones. By utilizing a series of ones, a simplification of the overall convolution sum, which is the sum of products is achieved as the operation is reduced to an operation of sums only.

Further features of the invention and the advantages offered thereby are explained in greater detail hereinafter with reference to specific embodiments illustrated in the accompanying drawings.

BRIEF DESCRIPTION OF THE DRAWINGS

FIG. 4 illustrates a specific case of a convolution sum in accordance with an embodiment of the present invention.

FIG. 5 illustrates a specific case of a convolution sum in accordance with an embodiment of the present invention.

FIGS. 6A and 6B illustrate the manner in which the data is buffered in a matrix format to perform parallel convolution in accordance with an embodiment of the present invention.

DETAILED DESCRIPTION OF THE PREFERRED EMBODIMENT

To facilitate an understanding of the principles and features of the present invention, it is explained hereinafter with reference to its implementation in an illustrative embodiment. In particular, the invention is described in the context of a vector processing computer system that performs discrete-time convolution. This may be accomplished, according to one embodiment, by a simplified computation using a vector containing all ones, thereby simplifying the sum-of-products operation associated with convolution to a simple summation. It will be appreciated, however, that this is not the only embodiment in which the invention can be implemented. Rather, it can find utility in a variety of computer configurations utilizing a variety of different signal vectors, as will become apparent from an understanding of the principles which underscore the invention.

Figure 1:
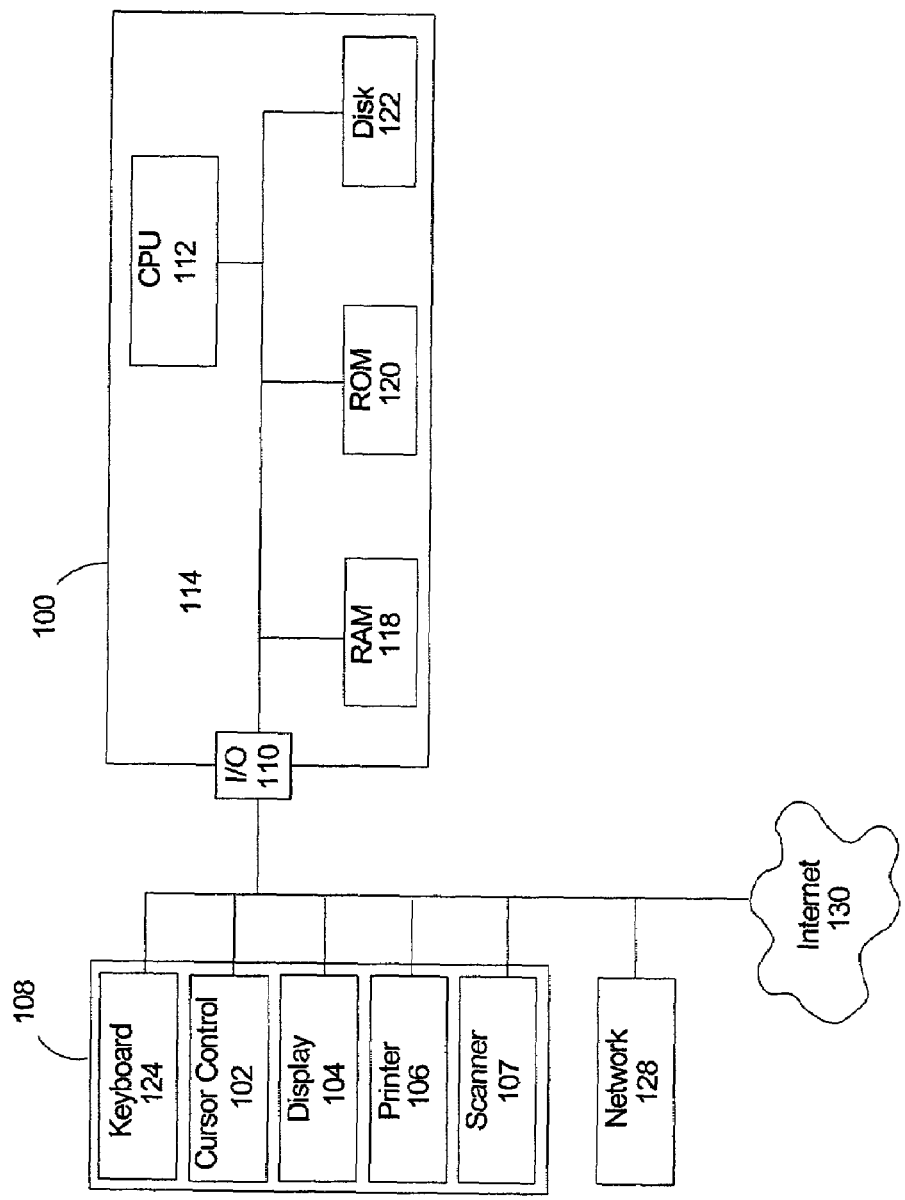
FIG. 1 is an exemplary computer system in which the system and method of the present invention may be employed.

An exemplary computer system of the type in which the present invention can be employed is illustrated in block diagram form in FIG. 1. The structure of the computer itself does not form part of the present invention. It is briefly described here for a subsequent understanding of the manner in which the features of the invention cooperate with the structure of the computer.

Referring to FIG. 1, the system includes a computer 100 having a variety of external peripheral devices 108 connected thereto. The computer 100 includes a Central Processing Unit (CPU) 112, a main memory which is typically implemented in the form of Random Access Memory (RAM) 118, a static memory that can comprise a Read Only Memory (ROM) 120, and a permanent storage device, such as a magnetic or optical disk 122. The CPU 112 communicates with each of these forms of memory through an internal bus 114. The peripheral devices 108 include a data entry device such as a keyboard 124, and a pointing or cursor control device 102 such as a mouse, trackball or the like. A display device 104, such as a CRT monitor or an LCD screen, provides a visual display of the information that is processed within the computer, for example the contents of a computer file. A hard copy of the information displayed on the display device 104 can be provided through a printer 106, or similar device. In addition, a scanner may be provided to allow the input and conversion of a paper document into computer processing memory. Each of these external peripheral devices communicates with the CPU 112 by means of one or more input/output ports 110 on the computer. The input/output ports 110 also allow the computer 100 to interact with a local area network server or an external network 128 such as a LAN, WAN, or the Internet 130.

Computer 100 typically includes an operating system, which controls the allocation and usage of the hardware resources such as memory, central processing unit time, disk space, and peripheral devices. In addition to an operating system, the computer 100 may also include various other software programs designed to interface with the CPU 112. Various functionalities are contained within the CPU 112, such as the ability to process data. One of the operations performed by the CPU 112 is the convolution sum used for signal processing which is shown in Equation 2.

Figure 2A:
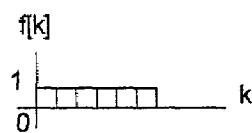
FIGS. 2A–2I illustrate a graphical representation of the process of performing a basic convolution sum.
Figure 2B:
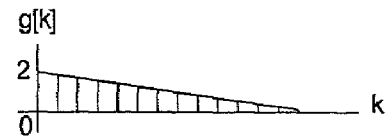
Figure 2C:
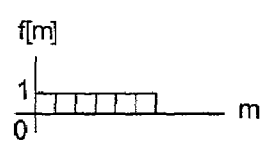
Figure 2D:
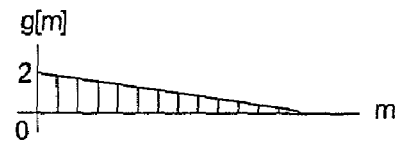
Figure 2E:
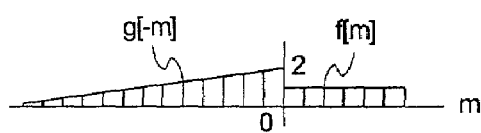

FIGS. 2A–2I show a graphical representation of the process of calculating the convolution sum shown in Equation 2. Two signals f[k] and g[k] are shown in FIGS. 2A and 2B, respectively. To facilitate an understanding of the manner in which the functions are processed during convolution, they are expressed in terms of a second parameter m, resulting in the signals f[m] and g[m] shown in FIGS. 2C and 2D, respectively. In FIG. 2E, one of the signals, in this case g[m], is reflected across the y-axis and expressed as g[−m]. The reflected signal g[m] is then shifted by varying amounts k until it has been translated over the entire length of the m-axis. Because the convolution is being calculated, the value of k is varied in increments that correspond to the increments between discrete values of each of the function f[k] and g[k] being operated on. At each value of k, the overlapping values of each function are multiplied together and the products summed.

Figure 2F:
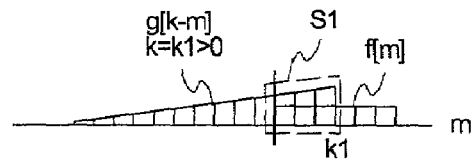
Figure 2G:
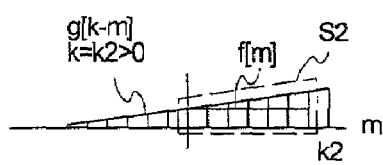
Figure 2H:
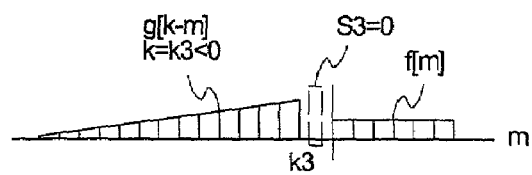
Figure 2I:
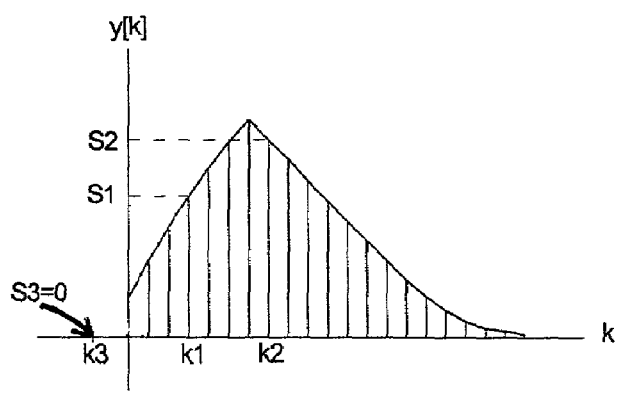

In the case shown in FIGS. 2A–2I, however, the first function f[k] is made up of a series of ones. Thus, summing the products of each of the overlapping functions (i.e., f[m] and g[k−m]) at each value of k is equivalent to the sum of each overlapping value of the second function g[k−m] for each value of k for which it overlaps the first function f[m]. In FIG. 2F, the function g[k−m] is shifted by the amount $k_1$. Summing the portions of g[k−m] that overlap f[k] when it is shifted by this amount results in a first sum $S_1$. In FIG. 2G, a second sum $S_2$ is achieved by shifting the second function g[k−m] by a different amount $k_2$ and summing the overlapping portions of the second function g[k−m]. In FIG. 2H, the situation in which the function g[k−m] is shifted by yet a different amount $k_3$, such that there is no overlap between the two functions, is shown. In this case, there is no sum to be performed, as no values of the two functions overlap and thus $S_3$ is zero. The overall result of the convolution sum is shown in FIG. 2I, where the result y[k] is illustrated along the k-axis, and corresponds to cumulation of all sums of the overlapping values of the two functions for each value of k.

In performing the convolution such as the one shown in FIGS. 2A–2I, however, there arises a complication as the number of values to sum may be great, and is generally performed as a serial process within computers. When the convolution shown in FIGS. 2A–2I is performed as a serial process, each value is operated upon in turn within a stream of data. When this stream of data is large, the time required to perform the convolution sum may be great, which may result in slowing other computer processing operations, or other undesirable effects (e.g., distortion of real-time data, etc.).

In order to speed up the convolution process, it may be implemented in a vector processing system in a manner such that calculations are performed in parallel. This can be accomplished by utilizing the distributive property inherent to the convolution sum. The distributive property of convolutions is shown in Equation 3 below.

$$y[k] = \qquad (3)$$
$$f[k] \circledast (g_1[k] + g_2[k]) = f[k] \circledast g_1[k] + f[k] \circledast g_2[k] = y_1[k] + y_2[k]$$

In Equation 3, the second function to be convolved g[k] is described as the sum of two components $g_1f[k]$ and $g_2[k]$. As shown in Equation 3, the result of convolving f[k] with the sun of two individual signals is actually the same as convolving f[k] with each of the two signals and then adding, or superimposing, the results. This property is useful in performing vector calculations of convolution because a large, complex signal may be buffered and divided into a specified number of data chunks and each of these data chunks may be operated upon individually in parallel. In the end, the same result can be obtained by superimposing the results of the operations performed on each of the data chunks separately.

Figure 3A:
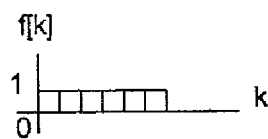
FIGS. 3A–3N illustrate graphically the manner in which convolution may be performed by breaking a function up into multiple pieces, as is performed in accordance with an embodiment of the present invention.
Figure 3B:
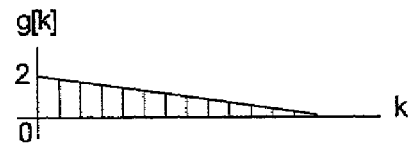
Figure 3C:
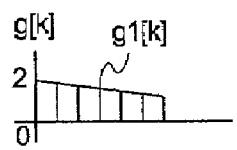
Figure 3D:
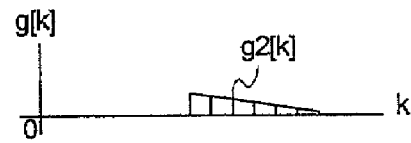
Figure 3E:
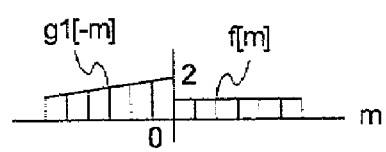
Figure 3F:
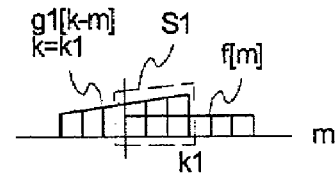
Figure 3G:
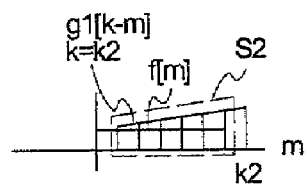
Figure 3H:
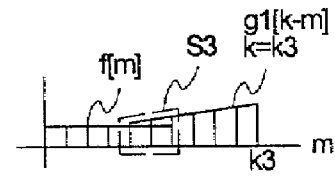
Figure 3I:
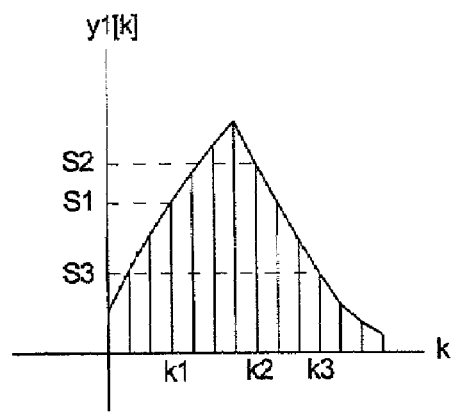
Figure 3J:
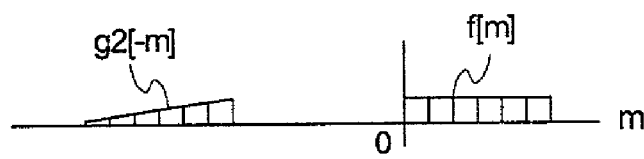
Figure 3K:
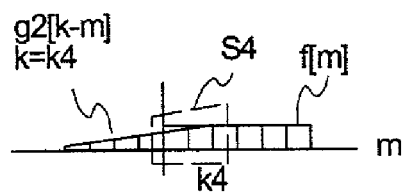
Figure 3L:
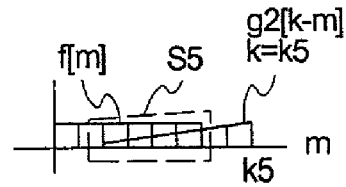
Figure 3M:
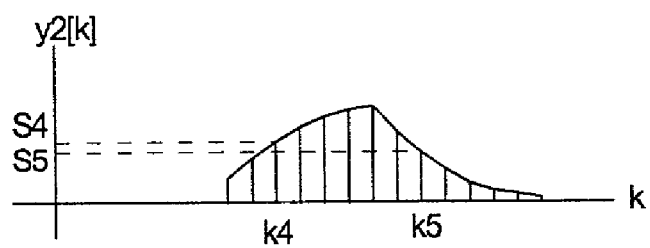
Figure 3N:
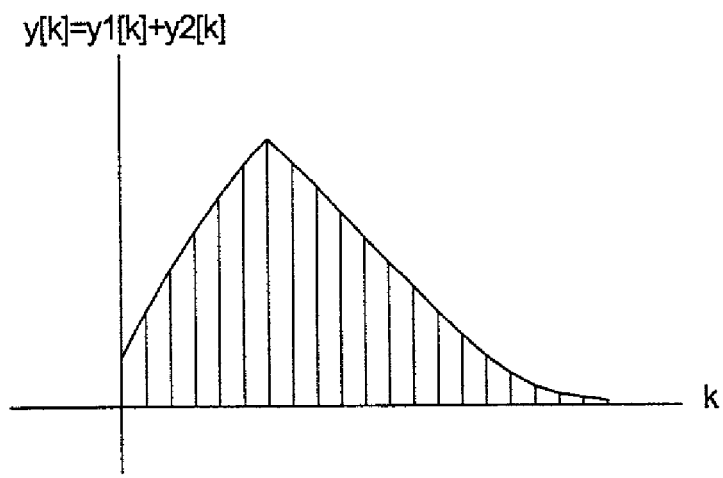

An example of performing convolution on individual components of a function is shown in FIGS. 3A–3N, which illustrates the use of the distributive property for performing discrete convolution sums. In FIGS. 3A and 3B two functions f[k] and g[k] are shown, respectively which are similar to the functions shown in FIGS. 2A and 2B. The function g[k], shown in FIG. 3B, may be divided into multiple parts, hereinafter referred to as data chunks. In FIGS. 3C and 3D, g[k] has been divided into two chunks $g_1[k]$ and $g_2[k]$, respectively. Each of these two chunks $g_1[k]$ and $g_2[k]$ is operated upon individually in FIGS. 3E–3H and FIGS. 3J–3L, respectively. The partial solutions associated with each data chunk are shown in FIGS. 3I and 3M, and the overall solution, which is a superposition of the partial solutions, is shown in FIG. 3M.

In FIG. 3E, the functions f[k] and $g_1[k]$ are expressed in terms of the parameter m and the second function is reflected across the y-axis, yielding f[m] and $g_1[-m]$. As illustrated in FIGS. 3A–3I, the convolution of the first data chunk of g[k], or $g_1[k]$, is performed as the transposed and reflected version $g_1[k-m]$ is translated across the m-axis by differing amounts k, as shown in FIGS. 3F, 3G, and 3H. In FIGS. 3F–3H each of the values of the overlapping portions of $g_1[k-m]$ are summed and the result is plotted in FIG. 3I as a first partial solution $y_1[k]$. FIGS. 3J, 3K, and 3L illustrate the convolution performed on the second data chunk of g[k], or $g_2[k]$, and the result, a second partial solution $y_2[k]$, is illustrated in FIG. 3M. FIG. 3N illustrates the superposition of the two convolution results of $g_1[k]$ and $g_2[k]$, as the two partial solutions $y_1[k]$ and $y_2[k]$ are added to arrive at the overall solution y[k].

In the example illustrated in FIGS. 3A–3N, the first function f[k] is illustrated as a series of seven ones. This is useful as this function reduces the sum of products usually associated with convolution to a simple sum. However, those skilled in the art will recognize that a function having other values may also be used with similar results. Also illustrated in FIGS. 3A–3N is the importance of correct alignment of the various signals and outputs. For example, the results of the convolution of f[k] with $g_1[k]$ and f[k] with $g_2[k]$ must be properly aligned such that when their values are superimposed the correct result is achieved. As the first partial solution $y_1[k]$ has the combined width of f[k] and $g_1[k]$ as shown in FIG. 3E, the two solutions $y_1[k]$ and $Y_2[k]$ will overlap. It is important to ensure that the solution $Y_2[k]$ is placed in the proper location, which in digital form is a bit location, so that the correct overall solution y[k] is achieved by proper superposition.

The generalized form of the distributive property of the convolution sum is shown in Equation 4 below.

$$y[k] = f[k] \circledast \sum_{n=1}^{N} g_n[k] = \sum_{n=1}^{N} \{f[k] \circledast g_n[k]\} = \sum_{n=1}^{N} y_n[k] \qquad (4)$$

Equation 4 illustrates that the distributive property is shown to work with more than two chunks of data, as multiple partial solutions may be summed (or superimposed) to achieve an overall solution. This property is useful in the present invention, as in a vector computer processing system multiple sets of data may be used simultaneously as multiple vectors may be simultaneously operated upon. In such a system, the processor time saved is at least proportionate to the number of simultaneous calculations that can be performed, and may be greater when data transfer operations are considered.

In Equation 4, the parameter N represents the number of chunks that the function g[k] is to be divided into. The value n is used as an index to distinguish the various chunks of the overall function g[k] (i.e., $g_1[k]$, $g_2[k]$, $g_3[k]$, . . . , $g_n[k]$, etc.). Equation 4 illustrates that regardless of the number of pieces or data chunks that the overall second function g[k] is broken up into, a first function f[K] may be convolved with each of these data chunks individually and the results (i.e., multiple partial solutions) can then later be superimposed upon each other, or added together, to yield the overall solution or resulting signal.

In FIG. 4, the discrete values of the solution y[k] are shown for the signals shown in FIGS. 3A and 3B. These values are arrived at by the convolution sum shown in Equation 2. However, in this illustrative example, as the first function f[k] is a specialized function, which is a series of seven ones, the multiplication step usually required for convolution is essentially removed changing the traditional sum of products to a simple sum. One skilled in the art will recognize, however, that this is a special case, and that the present invention need not be limited to such a specialized implementation. As can be seen in FIG. 4, the function g[k] is translated such that it overlaps f[k] and the overlapping values of the function are g[k] added to achieve the values of the solution. For example, the first bit of the solution, or the zero bit y[0], corresponds to the first value of the g[k] function, g[0]. Subsequent values of the g[k] function are then added to produce subsequent elements of the solution. The number of bits added from the function g[k] is increased for each bit of the solution y[K] until the size limit, or number of elements in the f[k] function (in this instance seven elements) is reached.

Then, as the function g[k] is translated with respect to the function f[k], the maximum number of seven elements which may overlap the f[k] function remains constant (e.g., as shown for y[6], y[7], and y[8]) and the subsequent groups of seven elements are added. This addition of each set of seven elements continues until the end of the function g[k] is reached. As the end of g[k] reaches the function f[k], element-by-element there is less overlap for each subsequent value of k (i.e., as g[k] is shifted further to the right). As the overlap decreases, so does the length of each partial solution vector $y_c[k]$, until there is no overlap, where the value of y[k] is 0.

The first seven values of the solution y[k] (i.e. y[0], y[1], y[2], y[3], y[4], y[5], y[6]) correspond to a period known as the ramp-up time. It is during this time when the number of elements to be convolved from the function g[k] is increased for each iteration. This occurs until the maximum overlap is achieved which in the case illustrated in FIG. 4 is an overlap of seven elements. For example, during the first iteration y[0] utilizes only one value of the g[k] function (i.e., g[0]). Until the number of iterations is equal to the length of f[k] (i.e., seven elements), which is also referred to as the stride length, each subsequent element of y[k] utilizes one additional element of g[k] in a summation than the preceding element of y[k]. When the last value in the ramp-up period has been calculated, the number of values of the function g[k] used to calculate the solution bit y[k] remains constant (i.e., seven elements in the case illustrated).

At the other end of the convolution, when the end of the function g[k] is reached and the overlapping portion between the functions begins to decrease below the stride length, a corresponding ramp-down process occurs, as illustrated in FIG. 5. In the example of FIG. 5, the parameter N represents the number of elements in the function g[k]. During the ramp-down period, the number of values being added decreases from the stride length (i.e., seven in the case illustrated) to zero with each iteration. As can be seen in FIG. 5, the length of the overall solution y[k] (i.e., the width of the solution function) is equivalent to the length of the two functions g[−m] and f[m] as shown in FIG. 2E with a single value overlapping. That is, the length of the solution y[k] is the length of g[−m], or N, plus the additional six values of f[m] that do not overlap g[−m] (i.e., N+6).

In order to perform the convolution on the function g[k] in a vectorized manner, the data is read into the computer processor as a standard stream of data, and divided into chunks of data. For instance, each data chunk might comprise eight elements of data. These data chunks can be visualized in matrix form as shown, for example, in FIG. 6. In this form, the vector processor can operate upon eight different items of data at a time. To do this efficiently, the matrix is transposed, so that each element at position (i,j) is moved to a new position (j,i), for all values of i and j. An example of the transposed matrix is shown in FIG. 6B. The data chunks are stored in the transposed matrix such that the first bit of each data chunk appears in the first row of the matrix, and successive bits of a data chunk appear in successive rows within a column of the matrix associated with that data chunk. That is, g[0] and g[8] are in the same row as they are the first bit of their respective data chunks.

The second bit of each data chunk is distributed in the second row and the third bit in the third row, and so forth. After the data has been arranged into the matrix, as shown for example in FIG. 6B, it is then operated upon in the manner described in connection with FIGS. 4 and 5, as follows.

Each of the data chunks, which are separated into individual columns within the matrix shown in FIG. 6B, are operated upon simultaneously using the distributive property shown in Equation 4. There is no loss due to the need for each of the data chunks to undergo a ramp-up time, as this time period is needed regardless of the signal being convolved, and performing eight ramp-up calculations simultaneously requires no more time than performing the necessary single ramp-up calculation. Equation 5 below shows the relationship of the columns of the matrix shown in FIG. 6 to g[k] as a whole.

$$g[k] = \sum_{c=1}^{8} \vec{g}_c[k] \quad (5)$$

In the Equation 5 above, $\vec{g}_c[k]$ is the vector stored in column C. Thus, in Equation 5, g[k] is shown as a sum or superposition of all of the column vectors shown in the matrix of FIG. 6. Equation 5 indicates that the superposition of all (i.e., eight) of the column vectors of the matrix in FIG. 6B yields the function g[k]. It should be noted that in performing the superposition of Equation 5, the element indices of each element of g[k] may be retained so that the function shown in Equation 5 acts as a vector superposition rather than a scalar summation.

The convolution of each of the column vectors shown in FIG. 6B yields the individual solution vectors in column form. It will be appreciated by those skilled in the art that the convolution of each of the column vectors shown in FIG. 6B may be performed concurrently, or in parallel. Equation 6 below shows the manner in which the column vectors $\vec{y}_c[k]$ of the overall solution matrix y[k] may be calculated.

$$\vec{y}_c[k] = \sum_{r=1}^{M+6} [\vec{g}_c[8c-(9-r))-6] + \\ [\vec{g}_c[8c-(9-r))-5] + [\vec{g}_c[8c-(9-r))-4] + \\ [\vec{g}_c[8c-(9-r))-3] + [\vec{g}_c[8c-(9-r))-2] + \\ [\vec{g}_c[8c-(9-r))-1] + [g_c[8c-(9-r))]] \quad (6)$$

In Equation 6, M represents the maximum number of elements in the column vector, or of rows in the matrix shown in FIG. 6, which in this is case eight. This value may vary, however, as will be readily appreciated by those skilled in the art. The term 8c−(9−r) is the index of gyp (i.e., 8c−(9−r) is k). The values r and c represent the row and column, respectively, of the matrix shown in FIG. 6B from which the element is read. Equation 6 uses a summation of seven elements because, in this specific case, the stride length, or the length of the function f[k] being convolved with g[k] (i.e., the maximum length of the two functions), is seven. However, as will be appreciated by those skilled in the art, this stride length may vary, and the number of terms used in the convolution summation will vary accordingly.

The summation in the case of the matrix shown in FIG. 6B will vary between 1 and 14, which corresponds to the total width of the function f[k], and each portion of the function g[k] when reflected and having a single value overlapping f[k], as shown in FIG. 3E (i.e., the size of f[k], or the stride length which is 7, plus the size of each column vector $\vec{g}_c[k]$ which is 8, less the number of overlapping values, which is 1).

The convolution sum shown in Equation 6 corresponds to the operation shown in FIGS. 4 and 5. That is, the various summations of elements within the chunks of data are summed together. The result is a column vector $\vec{y}_c[k]$ partial solution for each column of data in the matrix shown in FIG. 6. Each of the partial solutions may then be superimposed under the principle of distribution, to calculate a final result or overall solution y[k] as shown in Equation 7 below.

$$y[k] = \sum_{c=1}^{P} \vec{y}_c[k] \qquad (7)$$

In Equation 7, the value P represents the maximum number of columns of the matrix containing the column vectors $\vec{g}_c[k]$ of the function g[k], which in the case shown in FIG. 6B is eight. This value may vary, however, as will be appreciated by those skilled in the art.

Because of the ability to superimpose the results of multiple convolution sums, a vector processing system may simultaneously perform the convolution sum operation on entire rows of the matrix shown in FIG. 6B according to Equation 6 (i.e., all column vectors may be operated upon simultaneously). This creates an answer matrix which contains the individual solution column vectors $\vec{y}_c[k]$ that can then be summed, or superimposed, according to Equation 7 to obtain the overall solution y[k] to the convolution of the function g[k] with the function f[k].

The effect of performing simultaneous convolutions on all of the columns of data in the matrix of FIG. 6B and superimposing the resulting solution vectors to achieve an overall solution is that the computation time to perform the desired convolution is dramatically reduced. Further increases of speed are expected as matrices with more columns are handled, allowing more columns of data to be processed simultaneously. The vector processing system and method of the present invention can increase the capture speed of an entire stereo video capture by a significant amount, thereby allowing for either better resolution per frame or a higher frame rate. This speed is also expected to increase as more vectors are able to be processed in parallel.

From the foregoing, it can be seen that the present invention provides a system and method for performing single channel convolution in a vector computer processing system. This convolution is performed by using the distributive property of convolutions in discrete-time and superimposing the partial solutions to achieve an overall solution. One embodiment of the present invention is directed to convolution of a first signal with a special second signal of 7 bits which each have a value of 1. This provides a simplification of the discrete convolution sum, allowing for a simple summation to be calculated rather than the sum of products.

It will be appreciated by those of ordinary skill in the art that the present invention can be embodied in other specific forms without departing from the spirit or essential characteristics thereof. For example, the invention has been described for an illustrative case in which one of the convolved functions is a vector of seven bits which each have a value of 1. However, the present invention can also be used with vectors of varying sizes having elements of various values. It is conceivable as the computing power increases, the size of the data chunks with which calculations are performed may be increased. Also, the size of the matrix containing the various vectors which are used in the convolution may also be increased according to the computing power of the processor being used. It is also possible, that the length and size of the vector with which a signal is convolved may conform to a specific, desired application or a specific signal present in a particular application.

The presently disclosed embodiments, are, therefore, considered in all respects to be illustrative and not restrictive. The scope of the invention is indicated by the independent claims, rather than the foregoing description, and all changes that come within the meaning and range of equivalents thereof are intended to be embraced therein.

What is claimed is:

1. A method of processing and reproducing information contained in an information signal in a vector processing computer system, comprising the steps of:
    buffering a first data stream into multiple data chunks;
    aligning the data chunks such that a first bit of each data chunk is aligned in the same position within multiple respective vectors;
    performing convolution sums on each data chunk simultaneously relative to a second data stream, wherein at least one of said first and second data streams pertains to said information signal;
    storing the results of the convolution sums of each data chunk as partial solution vectors of an overall solution;
    superimposing the partial solution vectors of each of the convolution sums to achieve an overall solution stream of data; and
    reproducing information contained in said solution stream of data in a tangible format.

2. The method of claim 1, wherein the step of aligning comprises storing the multiple vectors within a single matrix.

3. The method of claim 2, wherein the vectors comprise column vectors of the single matrix.

4. The method of claim 2, wherein the matrix comprises 64 elements.

5. The method of claim 1, wherein the first stream of data represents said information signal.

6. The method of claim 5, wherein the information signal comprises a video signal.

7. The method of claim 5, wherein the information signal comprises an audio signal.

8. The method of claim 1, wherein the second stream of data represents said information signal.

9. The method of claim 8, wherein the information signal comprises a video signal.

10. The method of claim 8, wherein the information signal comprises an audio signal.

11. The method of claim 1, wherein the second stream of data comprises multiple elements that all have the value of one.

12. The method of claim 1, wherein the second stream of data comprises a data stream having a stride length of 7.

13. The method of claim 1, wherein the step of buffering comprises buffering data into multiple data chunks, each data chunk having a length of 8 elements.

14. The method of claim 1, wherein said information signal is an image signal, and said reproducing step comprises display of the processed image.

15. A system for performing convolution of a first stream of data with a second stream of data in a vector processing computer system, comprising:
   means for buffering the first data stream into multiple data chunks;
   means for aligning the data chunks such that a first bit of each data chunk is aligned in the same position within multiple respective vectors;
   means for performing convolution sums on each data chunk simultaneously;
   means for storing the results of the convolution sums of each data chunk as partial solution vectors of an overall solution;
   means for superimposing the partial solution vectors of each of the convolution sums to achieve an overall solution stream of data; and
   means for producing an output signal based on the overall solution stream of data.

16. A computer readable medium containing a program that executes the following steps:
   buffering a first data stream into multiple data chunks;
   aligning the data chunks such that a first bit of each data chunk is aligned in the same position within multiple respective vectors;
   performing convolution sums on each data chunk simultaneously;
   storing the results of the convolution sums of each data chunk as partial solution vectors of an overall solution; and
   superimposing the partial solution vectors of each of the convolution sums to achieve an overall solution stream of data.

17. A vector processing system that performs convolution of a first data stream and a second data stream, comprising:
   a memory that receives and stores the first data stream in the form of multiple vectors wherein each vector comprises a respective data chunk of the first data stream with the first bit of each data chunk being aligned in the same position within the respective vectors; and
   a vector processor that performs a convolution sum on each of said stored vectors simultaneously with respect to said second data stream, to obtain partial solution vectors, and sums the partial solution vectors to obtain a full convolution result.

18. The vector processing system of claim 17, wherein said first data stream comprises a video signal.

19. The vector processing system of claim 17, wherein said first data stream comprises an audio signal.

20. The vector processing system of claim 17, wherein said second data stream comprises a sequence of elements each having a value of one.

* * * * *